United States Patent [19]
Bogese

[11] 3,720,973
[45] March 20, 1973

[54] BRAIDED CABLE COVER REMOVING MACHINE

[75] Inventor: Stephen B. Bogese, Roanoke, Va.

[73] Assignee: Virginia Plastics Company, Roanoke, Va.

[22] Filed: May 11, 1971

[21] Appl. No.: 142,308

[52] U.S. Cl. .................................15/88, 81/9.51
[51] Int. Cl. ..............................................H02g 1/12
[58] Field of Search ..........15/88, 4, 21 C, 21 D, 197; 134/9; 81/9.51

[56] References Cited

UNITED STATES PATENTS

| | | | |
|---|---|---|---|
| 2,929,285 | 3/1960 | Gulemi | 81/9.51 |
| 2,225,200 | 12/1940 | Ames | 15/88 |
| 755,937 | 3/1904 | Richardson et al. | 15/21 C |
| 3,307,213 | 3/1967 | Schofield | 15/197 |
| 3,050,763 | 8/1962 | Martin | 15/197 |
| 2,247,440 | 7/1941 | Hempel | 15/22 B |

Primary Examiner—Leon G. Machlin
Attorney—Berman, Davidson & Berman

[57] ABSTRACT

A machine for combing out the woven braid cover of an electric cable to permit connections to be made to the end of the cable with the metallic cover being wound into a single strand at the end for connection to a shielding or ground circuit. The machine includes opposed belts having a plurality of wire brush tufts secured thereto and with the tufts of the belts arranged in confronting relation. The cable with the woven metal braid thereon is inserted into the space between the belts so as to be contacted by the wire brush tufts which comb out the braid into individual strands. The end of the cable is inserted a pre-determined distance between the belts and is then pulled backwardly from between the belts with the desired amount of the woven cover combed into individual strands. The ends of the wire tufts are corrugated to facilitate the combing out action.

10 Claims, 9 Drawing Figures

PATENTED MAR 20 1973

INVENTOR.
STEPHEN B. BOGESE,

BY
Berman, Davidson & Berman,
ATTORNEYS.

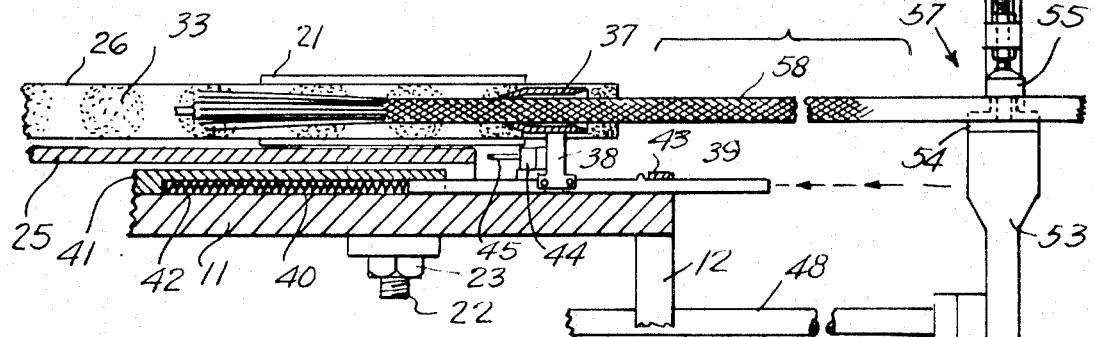
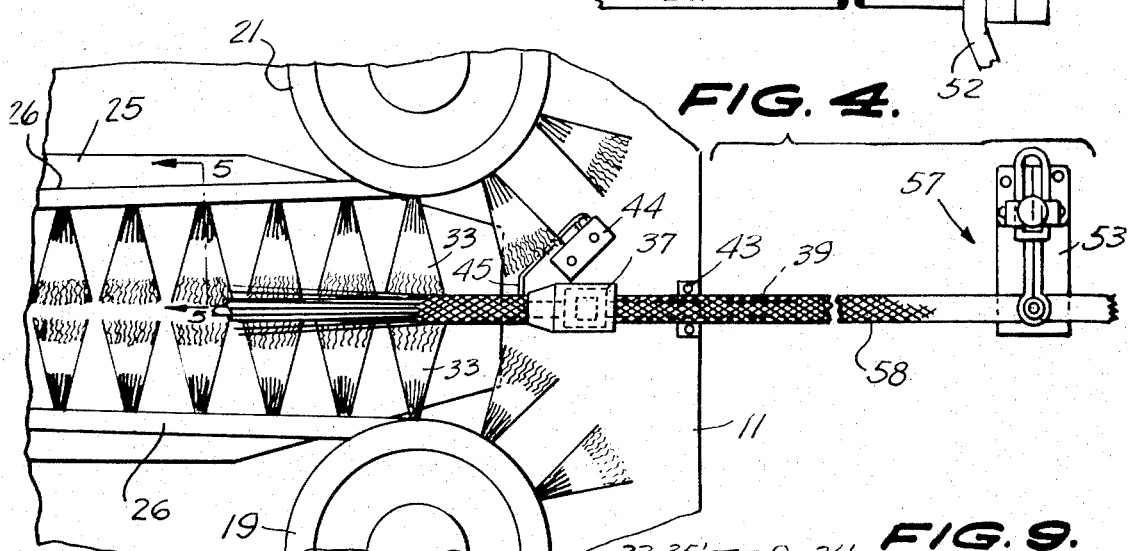
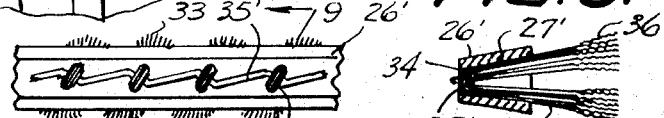
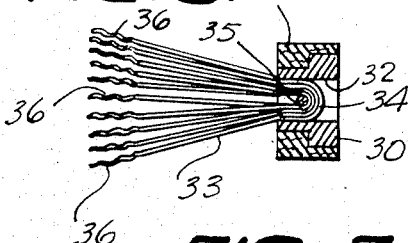
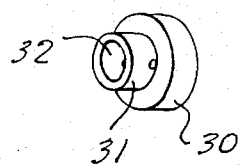
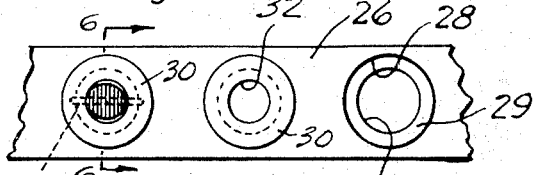

3,720,973

BRAIDED CABLE COVER REMOVING MACHINE

BACKGROUND OF THE INVENTION

Field of the Invention

The present invention relates to the field of stripping the ends of cables which have a braided metal cover.

SUMMARY OF THE INVENTION

In the instant invention a pair of horizontally mounted belts are arranged for carrying a plurality of wire tufts in opposed relation along one rung of the belts. A power system moves one end of a braided cable between the belts so as to be contacted by the wire brush tufts thereof to comb out the braided metal cover on the cable contacted by the tufts. The power system moves the cable back out from between the brushes upon completion of the combing out action.

The primary object of the invention is to provide a machine which will quickly and efficiently comb out the woven metal cover on the end of a cable to permit connection of the cable as required.

Other objects and advantages will become apparent in the following specification when considered in the light of the attached drawings.

BRIEF DESCRIPTION OF THE DRAWINGS

FIG. 3 is an enlarged fragmentary vertical sectional view taken along the line 3—3 of FIG. 1, looking in the direction of the arrows;

FIG. 4 is an enlarged fragmentary top plan view of the invention with parts broken away and omitted for convenience of illustration;

FIG. 5 is a fragmentary elevational view of the back of one of the belts;

FIG. 6 is a transverse sectional view taken along the line 6—6 of FIG. 5, looking in the direction of the arrows;

FIG. 7 is a perspective view of one of the tuft holding inserts shown in FIGS. 5 and 6;

FIG. 8 is a fragmentary elevational view of a modified belt structure; and

FIG. 9 is a transverse sectional view taken along the line 9—9 of FIG. 8, looking in the direction of the arrows.

DESCRIPTION OF THE PREFERRED EMBODIMENTS

Figure 1:
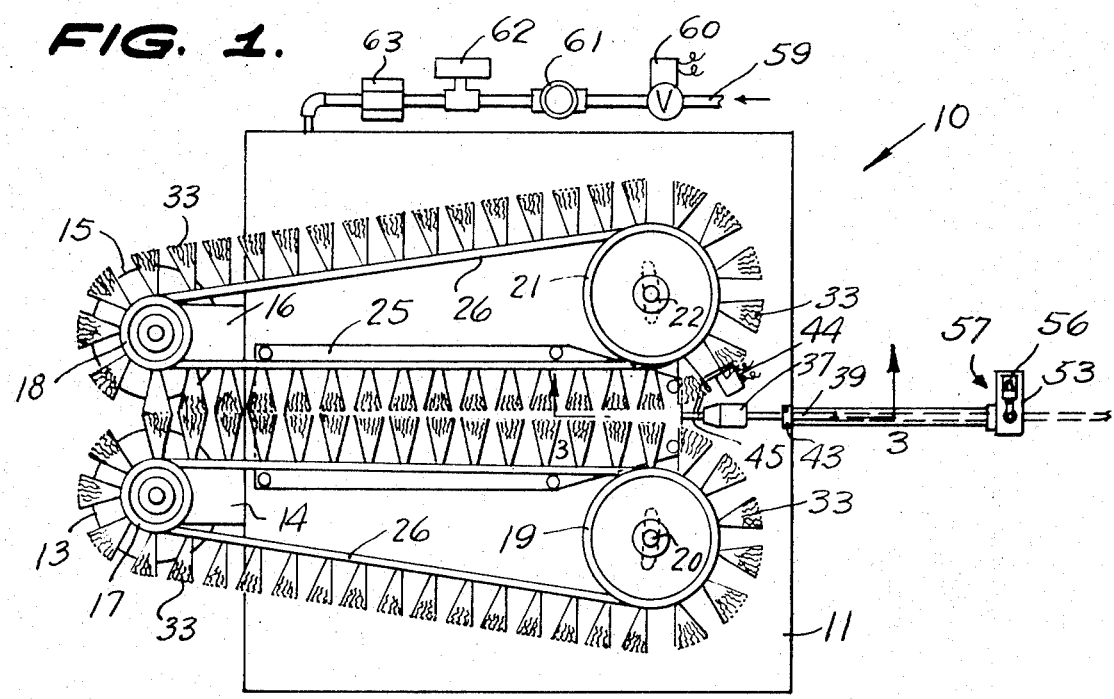
FIG. 1 is a top plan view of the invention.

Referring now to the drawings in detail wherein like reference characters indicate like parts throughout the several figures the reference numeral 10 indicates generally a machine for removing the braided wire cover from an electrical cable.

The machine 10 includes a table-top 11 supported on a frame 12 extending downwardly therebeneath. An electric motor 13 is secured to the frame 12 by means of a bracket 14 with the motor 13 arranged with its axis upright. A second identical motor 15 is secured to the frame 12 by a bracket 16 in side by side relation to the motor 13 with its axis also upright. The motor 13 has a drive pulley 17 mounted thereon and the motor 15 has a drive pulley 18 mounted thereon.

An idler pulley 19 is journalled on a shaft 20 which extends through and is secured to the table 11. A second idler pulley 21 is journalled on a shaft 22 which extends through the table 11 and is secured thereto by a nut 23. The shaft 20 is secured to the table 11 by a nut 24. The idler pulleys 19, 21 have the same diameter and are somewhat larger than the drive pulleys 17, 18.

A relatively narrow platform 25 is secured to the top of the table 11 and is spaced thereabove to a point slightly below the run of the pulleys 17, 18, 19 and 21. A flexible belt 26 is trained over the drive pulley 17 and the idler pulley 19 to extend generally horizontal and parallel to the table 11 and platform 25. A second identical flexible belt 26 is trained over the drive pulley 18 and the idler pulley 21. The adjacent runs of the belts 26 are arranged in closely spaced parallel relation along the platform 25. The belts 26 each have a plurality of relatively large bores 27 formed therein in equispaced relation therealong. Each of the bores 27 has a counter bore 28 formed therein to produce a shoulder 29 at the juncture of the bores 27, 28. A generally cylindrical insert 30 has a reduced diameter portion 31 extending axially therefrom. A bore 32 extends axially completely through the insert 30 to receive a wire brush tuft 33 inserted therein. The wire brush tuft 33 includes a plurality of individual wires which are folded over at 34 to engage about a transverse pin 35 extending through the insert 30. The free ends of the wires in the wire brush tuft 33 are corrugated at 36 to improve their grip with the braided cable cover to be removed.

A tubular guide 37 is mounted on a post 38 secured at its lower end to a sliding bar 39. The guide 37 is positioned intermediate the parallel runs of the belts 26 and is aligned with the abutting ends of the tufts 33. The rod 39 slides into a pocket 40 formed in a guide member 41 secured to the table 11 beneath the platform 25. A coil spring 42 in the pocket 40 normally urges the bar 39 outwardly therefrom. A bushing 43 on the table 11 supports the outer end of the bar 39.

A microswitch 44 is mounted on the table 11 and has an arm 45 extending into the path of travel of the post 38 so that upon movement of the bar 39 and the post 38 toward the space between the belts 26 the post 38 will contact the arm 45 and actuate the microswitch 44 for reasons to be assigned.

A cable clamp and inserter unit is indicated generally at 46 and includes a pneumatic cylinder 47 secured to the underside of the table 11 and having a piston rod 48 extending outwardly therefrom parallel to the table 11. A hydraulic check unit 49 is positioned below the pneumatic cylinder 47 and is supported on frame members 50 depending therefrom. A piston rod 51 extends outwardly from the hydraulic check unit 49 parallel to the piston rod 48. A link 52 connects the outer ends of the piston rods 48, 51 so that they move together upon actuation of the pneumatic cylinder 47.

A post 53 is secured to the outer end of the piston rod 48 and extends upwardly therefrom to align a lower jaw 54 secured to the upper end thereof with the tubular guide 37. An adjustable upper jaw 55 is arranged to be moved toward the lower jaw 54 by a hand actuated lever 56 mounted on the post 53. The jaws 54, 55 form a clamp generally indicated at 57 to clamp the cable 58 to be stripped therebetween.

Figure 2:
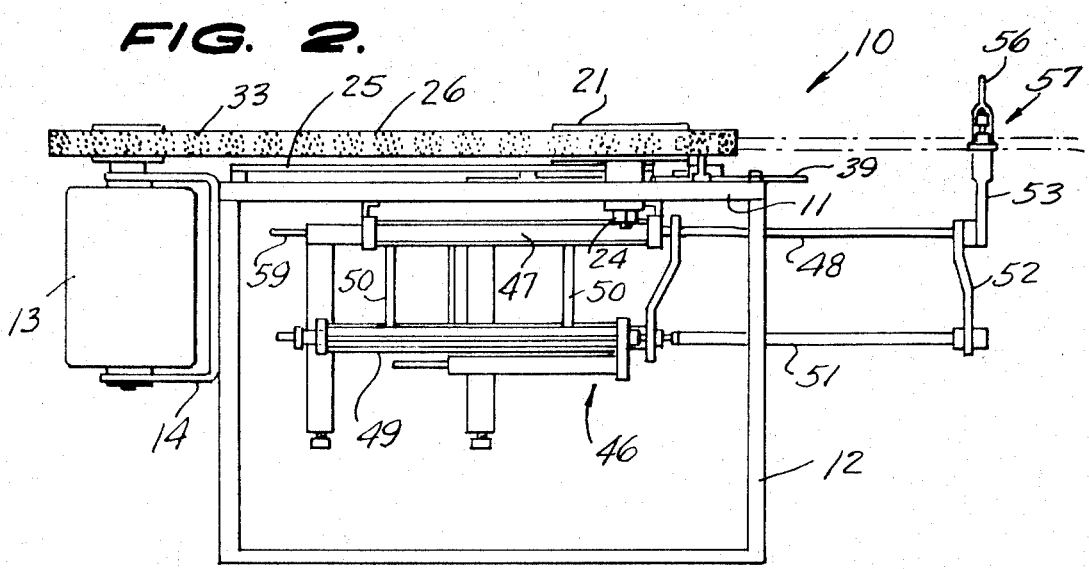
FIG. 2 is a side elevation of the invention.

In the use and operation of the invention air under pressure feeds through a conduit 59 past an electrically actuated valve 60, a lubricator 61, a pressure regulator 62, and a filter 63 before reaching the pneumatic cylinder 47 to cause the piston rod 48 to move to the left as viewed in FIG. 2 against the pressure of a return spring. When the post 38 engages the arm 45 of the microswitch 44 the valve 60 is closed in the conduit 59 and opened to bleed air from the pneumatic cylinder 47 to permit the spring to return the piston rod 48 to the right in FIG. 2. This action moves the clamp 57 inwardly toward the guide 37 and then outwardly away from the guide 37. The cable 58 is first inserted through the guide 37 and then is clamped in the clamp 57 so that as the clamp 57 moves toward the guide 37 the cable 58 is inserted to the space between the wire brush tufts 33 which then sweep along the braided metal cover and comb out the individual strands so that they may then be wound together to form a connector for shielding or ground purposes. The cable 58 after the clamp 57 has moved to the right is then taken out of the clamp 57 and removed from the guide 37 for use. The combing out action occurs in an extremely short period of time as compared to the individual picking out of the braid by hand.

A modified form of the invention is illustrated in FIGS. 8 and 9 wherein a flexible belt 26' has a conventional V-belt configuration with a plurality of V-shaped pockets 27' formed therein in equi-spaced relation therealong. A wire brush tuft 33 is inserted in each of the pockets 27' and an elongate tuft retaining wire 35' is engaged in the fold 34 of each of the tufts 33.

The use of the belt 26' is identical to that of the belt 26 and only requires that the pulleys 17, 18, 19 and 21 be shaped to receive the V-configuration thereof.

Having thus described the preferred embodiments of the invention it should be understood that numerous structural modifications and adaptations may be resorted to without departing from the spirit of the invention.

What is claimed is:

1. A machine for combing out the woven braid from the end of an electric cable comprising a plurality of oppositely disposed wire brush tufts arranged for contacting opposite sides of the cable, means mounting said tufts for movement along the cable end in a path parallel to the axis of said cable, means for moving the cable in the direction of movement of said tufts into contacting relation with said tufts with said tufts combing the braid cover into individual strands, with said last named means including means for removing said cable in a direction opposite the movement of said tufts from contact with said tufts upon completion of the combing operation.

2. A machine as claimed in claim 1 wherein said tufts are mounted on opposed endless belts.

3. A machine as claimed in claim 1 wherein each of said tufts include a plurality of wires with each of said wires having corrugated end for engaging the cable to be stripped.

4. A machine as claimed in claim 2 wherein said endless belt includes a plurality of pockets for receiving a generally cylindrical tuft carrying insert mounted in said pocket.

5. A machine as claimed in claim 2 wherein said endless belt is V-shaped and has a plurality of pockets formed therein in equi-spaced relation, said tufts being secured in said pockets by an elongate tuft retaining wire extending along said belt.

6. A machine for combing out the woven braid from the end of an electric cable as claimed in claim 1 wherein the means for moving said cable into the space between said tufts includes a pneumatic cylinder and a hydraulic check unit.

7. A machine as claimed in claim 6 wherein a cable clamp is secured to the piston rod of said pneumatic cylinder for clamping the cable to be stripped for moving it in and out of stripping position.

8. A machine as claimed in claim 7 wherein a tubular guide is positioned to guide the cable moved by said clamp into the position for contact by said tufts.

9. A machine as claimed in claim 8 wherein said tubular guide is moveable by movement of said clamp to control the movement of said cable toward stripping position.

10. A machine as claimed in claim 9 wherein means contacted by said moveable guide controls the flow of air to said pneumatic cylinder.

* * * * *